June 17, 1941.   S. BROCKHAUS   2,246,289
REVERSING SYSTEM FOR ASYNCHRONOUS MOTORS
Filed Dec. 17, 1938

WITNESSES:
Edward Michaels
William J. Ruano

INVENTOR
Siegfried Brockhaus.
BY
Paul E. Friedmann
ATTORNEY

Patented June 17, 1941

2,246,289

UNITED STATES PATENT OFFICE 2,246,289

REVERSING SYSTEM FOR ASYNCHRONOUS MOTORS

Siegfried Brockhaus, Essen, Germany, assignor to Westinghouse Electric & Manufacturing Company, East Pittsburgh, Pa., a corporation of Pennsylvania Application December 17, 1938, Serial No. 246,405 In Germany April 26, 1938

10 Claims. (Cl. 172—274)

My invention relates to a device which shortens the time interval required for reversing an asynchronous motor.

In reversing the direction of rotation of a three-phase asynchronous motor, that is, by reversing the direction of rotation of the field, it is often desirable that the motor, within as short a time as possible, rotate in the reverse direction. There is, of course, a time lag between the moment a reversing impulse is given as by the closing of a switch and the moment at which the motor actually begins to rotate in a reverse direction. There is also a definite time delay in the operation of the switch, which may be either a circuit breaker, or relays, or by manual operation of a reversing switch or by a combination of these. This time delay is thus usually appreciable.

In accordance with my invention, I take advantage of this time interval by using it for braking. By connecting a condenser and a resistor in parallel to the stator during this interval of time and as a function of the operation of the reversing switch, the rotation of the machine is braked utilizing the principle of condenser braking.

An object of my invention is to shorten the time interval necessary in reversing the direction of rotation of an asynchronous motor.

Figure 1:
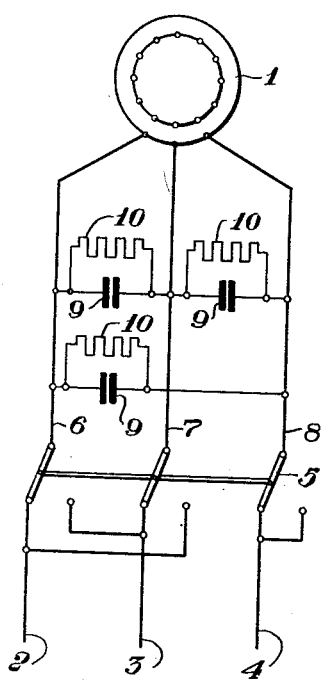
Figure 2:
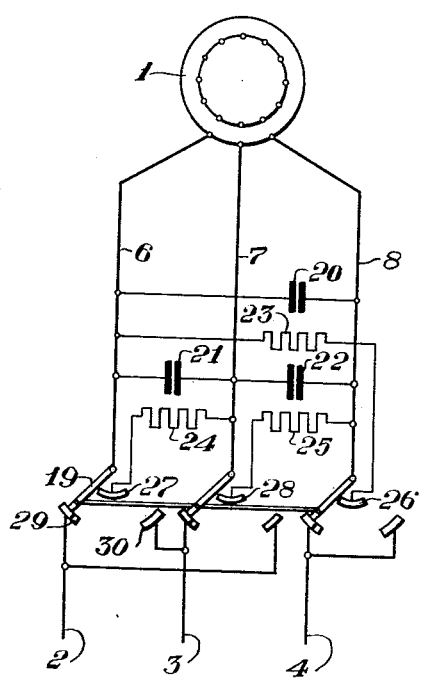

Other objects and advantages will become more apparent from the study of the following specification when considered in conjunction with the accompanying drawing, in which:

Figure 1 is a diagrammatic showing of my invention as applied to a three-phase asynchronous motor; and Fig. 2 is a modification of my invention as also applied to a three-phase asynchronous motor.

Referring to Fig. 1 of the drawing, reference character 1 denotes an asynchronous motor such as an induction motor which is fed from a three-phase power source represented by buses 2, 3 and 4. A three-pole reversing switch 5 is used to connect the power source to the conductors 6, 7 and 8, and to change the phase sequence of the connection, thus effecting a reversal in the direction of rotation of the field of motor 1; hence, a reversal of the direction of rotation of the motor is effected. A condenser 9 and a resistor 10, connected in parallel, are connected across each of the phases, that is, across conductors 6, 7 and 8.

The operation of the device is as follows: Assume that the motor is running in a certain direction and that the circuit is such as shown in Fig. 1. If it is desired to reverse the direction of rotation of the motor, the reversing switch 5 is moved to the right to a new set of contacts which, in effect, reverses the connection of buses 2 and 3 to the motor. As soon as switch 5 is disconnected from buses 2, 3 and 4, the electric energy source is interrupted. However, due to inertia, the rotor of motor 1 continues to rotate and the magnetic field is still present. However, in view of the condenser braking action of condenser 9, upon the rotor during the time the motor is disconnected from its power source, the interval of time required for the motor to slow down to zero speed is considerably shortened. Resistors 10 tend to improve the power factor.

While the embodiment shown in Fig. 1 is advantageous, inasmuch as no special reversing switch is required, there are losses due to the presence of condensers 9 and resistors 10 during the normal operation of the motor. These losses may be minimized by connecting the motor to a lower than rated source of potential, this having the effect of saturating the motor to a lesser extent.

Fig. 2 shows a modification of my invention; numerals 1 to 4, inclusive, and 6 to 8, inclusive, designate identical parts as the numerals 1 to 4 and 6 to 8, respectively of Fig. 1. Hence further description thereof is deemed unnecessary.

Condensers 20, 21 and 22 are permanently connected across the phases of conductors 6, 7 and 8. Resistors 23, 24 and 25 are provided and correspond to the resistors 10 of Fig. 1, but each of these resistors has one of its ends permanently connected to the conductors 6, 7 and 8, respectively, and the other or its ends connected to contact elements 26, 27 and 28, respectively. The lower segments, such as 29 and 30, of the reversing switch 19, are slightly elongated as shown.

The operation of the modification shown in Fig. 2 is as follows: Assume that the motor is running and that the circuit is as shown in Fig. 2. If it is desired to reverse the direction of rotation of the motor, the reversing switch 19 is moved to the right. Initially, resistors 23, 24 and 25 are not in the circuit since there is a gap between contact segments 26, 27 and 28 and the reversing switch contact arms. However, as soon as the reversing switch 19 is moved slightly to the right, the contact arms thereof engage contact segments 26, 27 and 28, thus connecting resistors 23, 24 and 25 in parallel with condensers 20, 21 and 22, respectively. Upon further movement to the right of reversing switch 19, the contact arms move off the contact segments, such as 29, and the motor is thus disconnected from its power source, at the same time, however, the condensers and resistors remain connected in parallel for the entire period of transition from connection of the stator windings for one direction of rotation to connection of the stator windings for the reverse direction of rotation in view of the extended shapes of contact pieces 26, 27 and 28. Hence a condenser braking action takes place which tends to stop the rotation of the motor in a very short interval of time. As the reversing switch 19 is moved still further to the right and the arms are brought into contact with contact segments, such as 30, a reversing connection is established for the motor 1. When the contact arms of the reversing switch first touch the contact segments such as 30, the resistors are still in circuit in view of the extended nature of contact segments 26, 27 and 28. However, when reversing switch 19 is finally moved to its extreme right position, the circuit is broken between the contact arms thereof, and contact segments 26, 27 and 28, thus the resistors are no longer in the circuit. It is thus seen with this arrangement that an economy of power is effected by not having the resistors permanently connected in the circuit during normal operation. It is obvious, of course, that contact segments 26, 27 and 28 may be shortened so that they will contact the contact arms of reversing switch 19 only when the switch is disconnected from the source; that is, from contact elements such as 29 and 30.

I am, of course, aware that others, particularly after having had the benefit of the teachings of my invention, may devise other circuits embodying my invention and I, therefore, do not wish to be limited to the specific showings made in the drawing and the descriptive disclosure hereinbefore made, but wish to be limited only by the scope of the appended claims and such prior art that may be pertinent.

I claim as my invention:

1. A control system for reversing an asynchronous motor comprising, in combination, a polyphase asynchronous motor having stator and rotor windings, a polyphase circuit connected to said stator winding, a polyphase source of electric energy, a manually operated reversing switch connected between said source and said polyphase circuit which reversing switch is adapted to reverse the phase sequence of said polyphase circuit in a manner to effect reversal of said motor, a condenser and a resistor which, as a direct consequence of switching movements in either direction of said reversing switch, are always connected in parallel across at least one of the phases of said polyphase circuit at and during the entire time said reversing switch is opened and during substantially the entire time during which said reversing switch is moved for effecting reversal, thereby effecting a condenser braking action on said motor during the entire changeover movement of said reversing switch to thus shorten the time of complete reversal of said motor.

2. A control system for reversing an asynchronous motor comprising, in combination, a polyphase asynchronous motor having stator and rotor windings, a polyphase circuit connected to said stator winding, a polyphase source of electric energy, a manually operated reversing switch connected between said source and said polyphase circuit which reversing switch is adapted to reverse the phase sequence of said polyphase circuit in a manner to effect reversal of said motor, a condenser and a resistor which, as a direct consequence of switching movements in either direction of said reversing switch, are always connected in parallel across each of the phases of said polyphase circuit at and during the entire time said reversing switch is opened and during substantially the entire time during which said reversing switch is moved for effecting reversal, thereby effecting a condenser braking action on said motor during the entire changeover movement of said reversing switch to thus shorten the time of complete reversal of said motor.

3. A control system for reversing an asynchronous motor comprising, in combination, a three-phase asynchronous motor having stator and rotor windings, a three-phase circuit connected to said stator winding, a three-phase source of electric energy, a manually operated reversing switch connected between said source and said three-phase circuit which reversing switch is adapted to reverse two of the lines in said three-phase circuit so as to effect reversal of said motor, a condenser and a resistor which, as a direct consequence of switching movements in either direction of said reversing switch, are always connected in parallel across at least one of the phases of said three-phase circuit at and during the entire time said reversing switch is opened and during substantially the entire time during which said reversing switch is moved for effecting reversal, thereby effecting a condenser braking action on said motor during the entire changeover movement of said reversing switch to thus shorten the time of complete reversal of said motor.

4. A control system for reversing an asynchronous motor comprising, in combination, a three-phase asynchronous motor having stator and rotor windings, a three-phase circuit connected to said stator winding, a three-phase source of electric energy, a manually operated reversing switch connected between said source and said three-phase circuit which reversing switch is adapted to reverse two of the lines in said three-phase circuit so as to effect reversal of said motor, a condenser and a resistor which, as a direct consequence of switching movements in either direction of said reversing switch, are always connected in parallel across each of the phases of said three-phase circuit at and during the entire time said reversing switch is opened and during substantially the entire time during which said reversing switch is moved for effecting reversal, thereby effecting a condenser braking action on said motor during the entire changeover movement of said reversing switch to thus shorten the time of complete reversal of said motor.

5. A control system for reversing an asynchronous motor comprising, in combination, a three-phase asynchronous motor having stator and rotor windings, a three-phase circuit connected to said stator winding, a three-phase source of electric energy, a manually operated reversing switch connected between said source and said three-phase circuit which reversing switch is adapted to reverse two of the lines in said three-phase circuit so as to effect reversal of said motor, a condenser connected in parallel across at least one of the phases of said three-phase circuit, and a resistor which, as a direct consequence of switching movements in either direction of said reversing switch, is always connected in parallel with said condenser during the entire time said reversing switch is opened and during substantially the entire time during which said reversing switch is moved for effecting reversal and adapted to be disconnected from the circuit when said reversing switch is closed.

6. A control system for reversing an asynchronous motor comprising, in combination, a three-phase asynchronous motor having stator and rotor windings, a three-phase circuit connected to said stator winding, a three-phase source of electric energy, a manually operated reversing switch connected between said source and said three-phase circuit which reversing switch is adapted to reverse two of the lines in said three-phase circuit so as to effect reversal of said motor, a condenser connected in parallel across each of the phases of said three-phase circuit, and a resistor which, as a direct consequence of switching movements in either direction of said reversing switch, is always connected in parallel with said condenser during the entire time said reversing switch is opened and during substantially the entire time during which said reversing switch is moved for effecting reversal and adapted to be disconnected from the circuit when said reversing switch is closed.

7. A control system for reversing an asynchronous motor comprising, in combination, an asynchronous motor having a plurality of terminals, manually operated means for selectively energizing the motor either for one direction of operation or for another direction of operation, and means adapted to provide an electrical braking effect in the motor during the entire transition period when the motor energization is changed from one direction of operation to another direction of operation and during substantially the entire time during which said manually operated means is moved for effecting reversal, said last-named means comprising a condenser and a resistor which, as a direct consequence of switching movements in either direction of said reversing switch, are always connected in parallel across two of the terminals of said motor.

8. A control system for reversing an asynchronous motor comprising, in combination, an asynchronous motor having a plurality of terminals, manually operated means for selectively energizing the motor either for one direction of operation or for another direction of operation, and means adapted to provide an electrical braking effect in the motor during the entire transition period when the motor energization is changed from one direction of operation to another direction of operation and during substantially the entire time during which said manually operated means is moved for effecting reversal, said last-named means comprising a condenser and a resistor which, as a direct consequence of switching movements in either direction of said reversing switch, are always connected in parallel across each of the terminals of said motor.

9. A control system for reversing an asynchronous motor comprising, in combination, an asynchronous motor having a plurality of terminals, manually operated means for selectively energizing the motor either for one direction of operation or for another direction of operation, and means including overlapping contact members adapted to provide an electrical braking effect in the motor during the transition period when the motor energization is changed from one direction of operation to another direction of operation and during substantially the entire time during which said manually operated means is moved for effecting reversal, said last-named means comprising a condenser permanently connected across a pair of the motor terminals and a resistor which, as a direct consequence of switching movements in either direction of said reversing switch, is always connected in parallel with said condenser during the entire said transition period and during a portion of the operation of said motor in either direction of rotation.

10. A control system for reversing an asynchronous motor comprising, in combination, an asynchronous motor having a plurality of terminals, manually operated means for selectively energizing the motor either for one direction of operation or for another direction of operation, and means including overlapping contact members adapted to provide an electrical braking effect in the motor during the transition period when the motor energization is changed from one direction of operation to another direction of operation and during substantially the entire time during which said manually operated means is moved for effecting reversal, said last-named means comprising a condenser permanently connected across each of the motor terminals and a resistor which, as a direct consequence of switching movements in either direction of said reversing switch, is always connected in parallel with said condenser during the entire said transition period and during a portion of the operation of said motor in either direction of rotation.

SIEGFRIED BROCKHAUS.